No. 745,632. PATENTED DEC. 1, 1903.
L. LECARME.
TWO SPEED GEAR FOR VELOCIPEDES, MOTOR CYCLES, &c.
APPLICATION FILED JAN. 20, 1903.
NO MODEL. 2 SHEETS—SHEET 1.

WITNESSES
H. M. Kuehne
J. M. Dowling

INVENTOR
Louis Lecarme
BY
ATTORNEYS

No. 745,632. PATENTED DEC. 1, 1903.
L. LECARME.
TWO SPEED GEAR FOR VELOCIPEDES, MOTOR CYCLES, &c.
APPLICATION FILED JAN. 20, 1903.
NO MODEL. 2 SHEETS—SHEET 2.
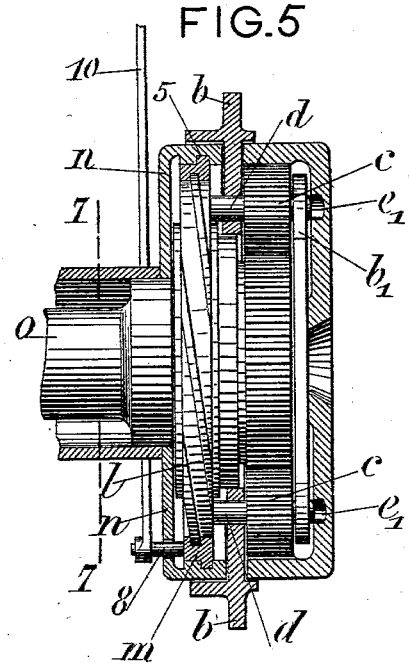
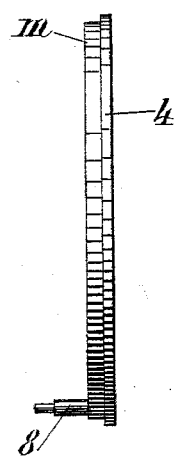
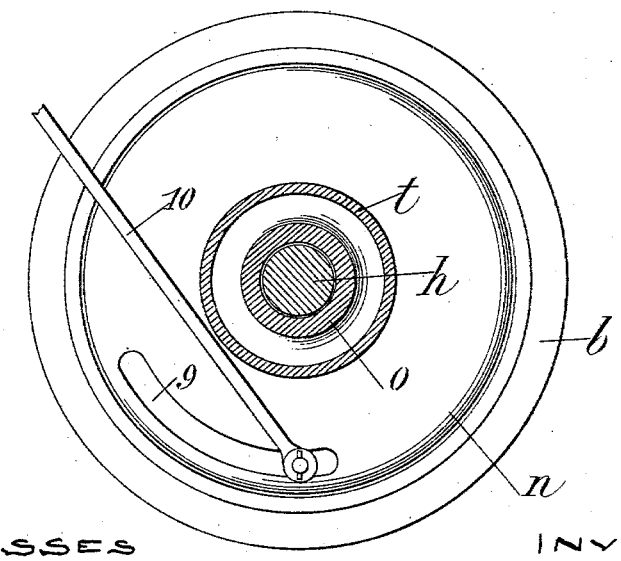
WITNESSES
INVENTOR
Louis Lecarme
ATTORNEYS No. 745,632.

Patented December 1, 1903.

UNITED STATES PATENT OFFICE.

LOUIS LECARME, OF PARIS, FRANCE.

TWO-SPEED GEAR FOR VELOCIPEDES, MOTOR-CYCLES, &c.

SPECIFICATION forming part of Letters Patent No. 745,632, dated December 1, 1903.

Application filed January 20, 1903. Serial No. 139,824. (No model.)

*To all whom it may concern:*

Be it known I, LOUIS LECARME, a citizen of France, residing at Paris, France, have invented an Improved Two-Speed Gear for Velocipedes, Motor-Cycles, and the Like, of which the following is a specification.

The present invention has for its object an arrangement of chain-wheel constituting a two-speed gear for various types of velocipedes and motor-cycles.

This apparatus has the following advantages: First, it can be adapted to all kinds of velocipedes without the necessity for modifying the framing; second, it enables a cyclist to change from one speed to the other without ceasing to pedal and without the necessity for reducing the speed for manipulating the disengaging; third, by reason of its mode of application it can be regulated in such manner as to preserve the chain-line and also enable all the usual accessories to be employed, such as the adaptation of a free wheel to the rear chain-wheel; fourth, being geared to operate at the high speed and with a free wheel, the pedals cannot turn backward, thus forming a fixed point of resistance similar to a foot-rest, thus giving more stability to the cyclist and facilitating dismounting by the pedal; fifth, the simultaneous gearing of the two speeds is rendered impossible according to the very principle of the apparatus.

The accompanying drawings represent an example of the apparatus intended especially for safety-bicycles.

Figure 1:
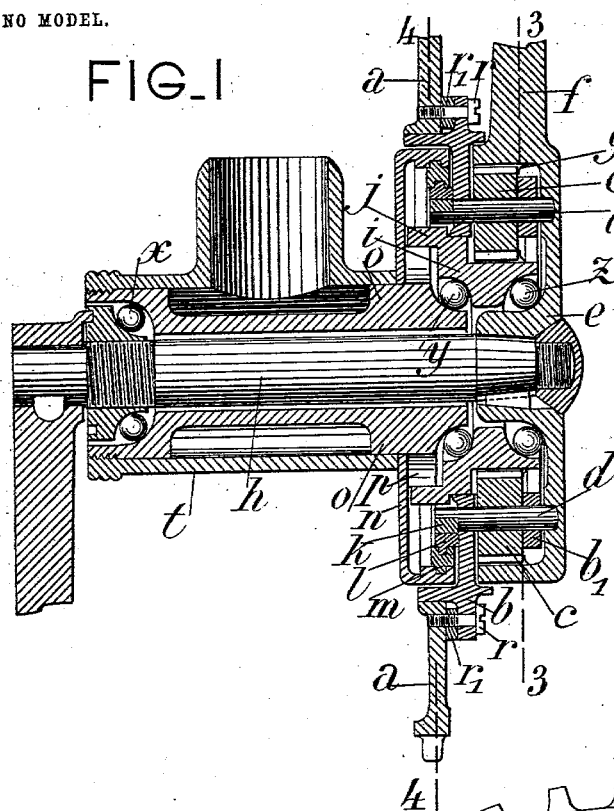
Figure 2:
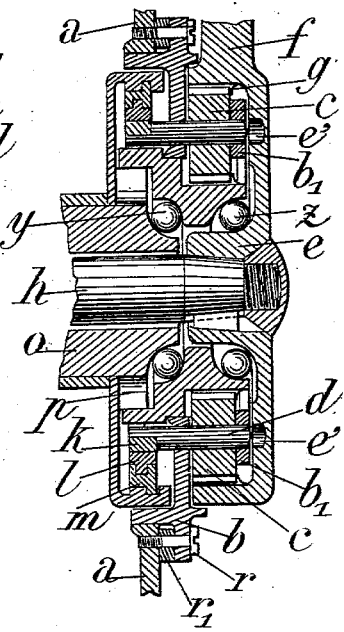
Figure 3:
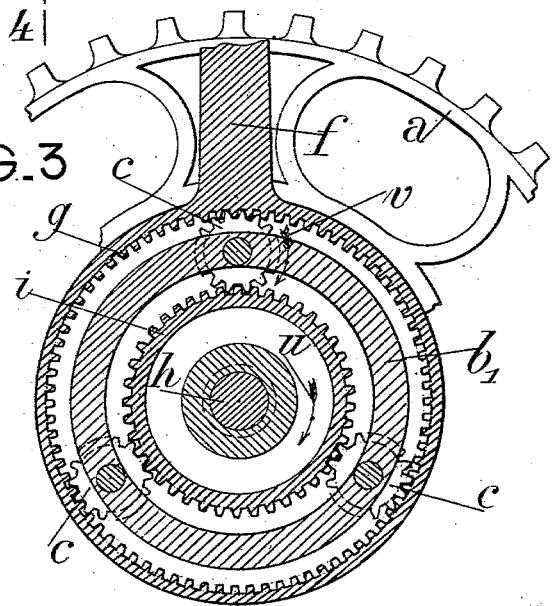
Figure 4:
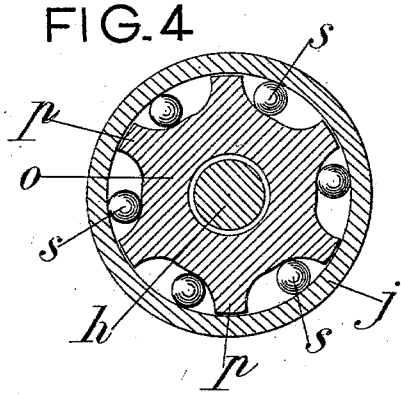

Figure 1 is an axial section of the gearing in the position of high speed. Fig. 2 is a similar sectional view of some of the parts in the position of low speed. Fig. 3 is a cross-section drawn on the line 3 3 of Fig. 1. Fig. 4 is a section of part of the apparatus drawn on the line 4 4 of Fig. 1. Fig. 5 is a horizontal section following the axis, with parts in elevation. Fig. 6 is a detail view. Fig. 7 is a section on line 7 7 of Fig. 5.

The toothed wheel $a$, which drives the chain, is fixed rigidly to the disk $b$ by means of screws $r$ and distance pieces or wedges $r'$, which enables the chain-line to be regulated. The disk $b$ is connected by cross-ties to a parallel disk $b'$ and carries on axles $d$ a certain number of planet toothed wheels $c$ $c$, gearing on one side with the interior teeth of an inclosing box $e$, keyed to the pedal-shaft $h$, and on the other side with the external teeth of a wheel $i$, supported by inner ball-bearings $y$ $z$, of which $z$ takes its bearing on the hub or exterior of the box $e$ and the other, $y$, on a fixed part of the frame.

The wheel $i$ carries a projecting ring $j$ in relation with the clutch $p$, furnished with rollers $s$, Fig. 4, such as those employed in the chain-wheels or hubs of so-called "free" wheels. For this purpose the plug $m$ has at the interior a lengthened screw-thread, Fig. 5, engaging the curved plane 1 and bears at its exterior, Fig. 6, a circular rim 4, engaging a groove 5 of the fixed casing $n$. The bolt 8, fixed on plug $m$, traverses the casing $n$ in a circular opening 9 and connects, through a rod 10, to a handle placed near the hand of the cyclist.

The clutch $p$ is fixed. It forms part of a false crank-bracket $o$, which is fixed to the interior of the crank-bracket $t$ and supports bearing-balls $y$. Thus the wheel $i$ $j$ can only turn forward in the direction of the arrow $u$ and becomes fixed when back pressure is applied to it. Finally the disk or wheel $b$ $b'$, which carries the planet-wheels $c$, can at will be rendered a fixture with the box $e$ by means of clutch-pins $d$, which, as shown in the drawings, are the axles of the planet-wheels. These clutch-pins are fixed to a disk or wheel $k$, which can receive a forward or backward motion parallel with the axis of the gearing. This movement engages or disengages the clutch-pins with holes $e'$, formed in the box $e$. The motion of the disk or wheel $k$ may be obtained in various ways, and especially as shown in the drawings, by a helicoidal ramp $l$, on which a nut $m$ engages, which by a rotary motion is moved in a direction perpendicular to its plane and moves with it the disk or wheel $k$ and the clutch-pins $d$.

The working of the apparatus is as follows: The high speed represented at Fig. 1 is obtained when the clutch-pins $d$ are engaged in the box $e$, which is fast with the crank $f$. All the arrangement is then moved by the forward movement of the crank consequent on the clutch $p$, Fig. 4, allowing the wheel $i$ $j$ to turn in this direction. The chain-wheel $a$ follows the movement of the pedal, and the entire system rolls on the balls $xy$, there being no friction at $z$, as the balls are not operating. It should be remarked that in this position the pedal cannot turn backward, which gives to the apparatus a further advantage with respect to the stability of the cyclist and the bearing which he finds to dismount by the pedal when there is a free back chain-wheel. To change to low speed, as shown in Fig. 2, the cyclist acts by suitable transmitting means on the mechanism, which withdraws the clutch-pins $d$. The crank $f$, having become free, (see Fig. 3,) carries with it the toothed wheel $g$, which tends to cause the planet-wheels $c$ to turn in the direction of the arrows $v$. These latter rolling on the wheel $i$ give a circular motion to the chain-wheel $a$ and by its reaction on the wheel $i$ keys the latter on the rollers $s$ of the fixed clutch $p$. Under these conditions the chain-wheel $a$ will travel in the same direction as the pedal, but with less speed, the relation between the two speeds depending on the number of the teeth of the wheels $i$ and $g$.

The mode of execution shown in the drawings has for its object to enable the system to be applied to all existing safety-bicycles without modifying their frame by means of the false crank-bracket $o$, carrying the fixed parts, the movable parts being carried by the crank-axle $h$.

The type described can be applied to tandems by placing to the left the second chain-wheel; to motor-safeties, motor-tricycles by driving the wheel $g$ by a belt, chain, or gearing instead of by the cranks; to tricycles, carrier-tricycles, &c., by accessory modifications relative to each particular case, as will be readily understood.

Having fully described my invention, what I claim, and desire to secure by Letters Patent, is—

1. In a two-speed gear for velocipedes, motor-cycles and the like, the combination of the crank, planet-wheels, an external gear meshing with such planet-wheels and fixed rigidly to the crank, an internal gear also meshing with such planet-wheels, a clutch with which such internal gear connects and which prevents it turning backward and a clutch arrangement adapted to be operated to render the planet-wheels fixed with or independent of the crank, substantially as set forth.

2. In a two-speed gear for velocipedes, motor-cycles and the like the combination of the driving part or crank, planet-wheels, an external gear meshing with such planet-wheels and fixed rigidly to the driving part, an internal gear also meshing with such planet-wheels, a clutch with which such internal gear connects and which prevents it turning backward, a clutch arrangement adapted to be operated to render the planet-wheels fixed with or independent of the driving part and a false crank-bracket capable of being fixed to any velocipede, motor-cycle or the like and carrying all the fixed parts of the apparatus, substantially as set forth.

In witness whereof I have hereunto set my hand in presence of two witnesses.

LOUIS LECARME.

Witnesses:
EDWARD P. MACLEAN,
GEORGE E. LIGHT.